United States Patent
Marini et al.

(10) Patent No.: US 10,641,151 B2
(45) Date of Patent: May 5, 2020

(54) LIQUID CONTAINER, ESPECIALLY A UREA SOLUTION CONTAINER, FOR A MOTOR VEHICLE

(71) Applicant: Röchling Automotive SE & Co. KG, Mannheim (DE)

(72) Inventors: Luca Marini, Besenello (IT); Enrico Merzari, S. Martino B.A. (IT); Manuel Pezzi, Campodenno (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 50 days.

(21) Appl. No.: 14/873,955

(22) Filed: Oct. 2, 2015

(65) Prior Publication Data

US 2016/0096140 A1    Apr. 7, 2016

(30) Foreign Application Priority Data

Oct. 7, 2014 (DE) .................. 10 2014 220 333

(51) Int. Cl.
*F01N 3/20* (2006.01)

(52) U.S. Cl.
CPC ........ *F01N 3/2066* (2013.01); *F01N 2610/02* (2013.01); *F01N 2610/1406* (2013.01); *F01N 2610/1413* (2013.01); *F01N 2610/1466* (2013.01); *Y02T 10/24* (2013.01)

(58) Field of Classification Search
CPC ........... F01N 3/2066; F01N 2610/1466; F01N 2610/1413; F01N 2610/1406; F01N 2610/02; Y02T 10/24; B01D 53/9431
USPC .................................................. 220/560.07
See application file for complete search history.

(56) References Cited

U.S. PATENT DOCUMENTS

| 3,887,104 A | * | 6/1975 | Cole ................... | B60K 15/077 220/722 |
| 2004/0201217 A1 | * | 10/2004 | Mobley ................ | F16L 11/127 285/417 |
| 2016/0263991 A1 | * | 9/2016 | Koukan ............... | B60K 15/035 |

FOREIGN PATENT DOCUMENTS

| DE | 1183815 | * | 12/1964 | |
| DE | 1183815 B | | 12/1964 | |
| DE | 1944150 U | | 8/1966 | |
| DE | 10059549 A1 | | 6/2002 | |
| EP | 2772451 A1 | * | 9/2014 | ............ B65D 79/00 |
| GB | 1029540 | * | 5/1966 | |
| GB | 1029540 A | | 5/1966 | |

* cited by examiner

*Primary Examiner* — Sally A Merkling
(74) *Attorney, Agent, or Firm* — Rankin, Hill & Clark LLP

(57) ABSTRACT

A liquid container for a motor vehicle, especially an urea solution container, comprising, as a container component, a tank surrounding an uptake volume, and, as a further container component, a filling line, which, in flow-mechanics terms, connects an admission location placed outside the tank at a distance from it, with the uptake volume, wherein at least a main section of the tank and at least a main section of the filling line are configured to be rigid so that they in essence remain free of deformity when the liquid container is used as directed, wherein on the tank and/or on the filling line at least one auxiliary tank or auxiliary filling line body surrounded by the filling line that expands the intake volume or the filling line volume, is formed, or is able to be formed by increasing the pressure in the interior of the liquid container.

19 Claims, 2 Drawing Sheets

LIQUID CONTAINER, ESPECIALLY A UREA SOLUTION CONTAINER, FOR A MOTOR VEHICLE

The present invention relates to a liquid container for a motor vehicle, comprising, as a container component, a tank surrounding an uptake volume, and, as a further container component, a filling line, which, in flow-mechanics terms, connects an admission location placed outside the tank at a distance from it, with the uptake volume, wherein at least a main section of the tank and at least a main section of the filling line are configured to be rigid so that they in essence remain free of deformity when the liquid container is used as directed.

BACKGROUND OF THE INVENTION

Customarily liquid containers are filled from without via the filling line, wherein a tapping cock or similar device is inserted at the admission location into the filling line and actuated to transmit the liquid.

Basically such a liquid container can also be a fuel tank or another operating liquid container of a motor vehicle; however, for the liquid containers currently under discussion, primarily it is urea solution containers that are considered, which are needed for a selective catalytic reaction in the exhaust system. The aqueous urea solution that is used for this as a rule is also designated in technical circles by its trade name of AdBlue®. The aqueous urea solution that is used to generate the selective catalytic reaction in the exhaust system must be refilled from time to time in the vehicle.

In filling the liquid container mentioned initially with liquid, as the degree of filling of the liquid container increases, pressure-related phenomena can occur in the interior of the container, which can cause the liquid already filled in the container to come sloshing out of it in an undesired spontaneous and sudden fashion.

For example, during the filling process in the tank of the liquid container, if gas, especially air, is included, and the filling process is continued, as the amount of liquid in the tank increases, the pressure in the liquid container can increase. This can get discharged spontaneously when liquid already filled into the liquid container is expelled.

To avoid such effects, liquid containers of the generic type in the prior art exhibit a check valve which closes when reaching a pre-set excess pressure, as it relates to the pressure at the admission location.

After the closing of the check valve, which customarily is provided in the filling line, the filling line is filled with liquid that passes through a tapping cock or a similar delivery mechanism, until the liquid column in the filling line reaches the tapping cock and the latter automatically switches off. Likewise the tapping cock can automatically switch off due to a pressure increase in the filling line, which pressure increase itself in turn can be caused by the filling of the filling line, closed by the check valve, with liquid.

At first, the liquid present in the filling line after closing of the check valve cannot pass into the tank, as long as the excess pressure in the tank cannot be reduced to the point where the check valve, also driven by the gravity of the liquid column found in the filling line, opens again.

To reduce the excess pressure in the tank, the prior-art liquid container customarily exhibits a special ventilation line, which, however, can also fill with liquid when the liquid container is filled with liquid. Then the ventilation line cannot carry out its ventilation function until it has been ventilated.

Therefore, the task of the present invention is to provide a further development of the liquid container named initially, so that it can be filled with liquid, with a simple structural design, while making it possible to reduce, or even avoid, the undesired spontaneous sloshing out of liquid already inserted.

SUMMARY OF THE INVENTION

This problem is solved according to the invention by a generic liquid container, on which at least one enlarging auxiliary tank or auxiliary filling line body is created, on the tank and/or on the filling line, which surrounds the uptake volume or the filling line, or can be created by increasing the pressure in the interior of the liquid container.

The main sections of the components of the liquid container (tank and filling line) are fundamentally configured to be rigid, so that when the liquid container is used as directed, they in essence do not deform, i.e., they undergo no substantial stretching and they do not bend substantially. For customary liquid containers made of plastic, in which the tank can perhaps be fabricated by blow molding, gravity can cause a slight and therefore negligible bowing of the base or one or more of the sides of the tank or in the liquid container. Usually this deformation increases the volume of the liquid container by not even 1%, so that a liquid container with components made of thermoplastics, blow-molded or injection-molded, can be considered as undeformable when used as directed in the context of the present application.

Trials have shown that that an auxiliary tank body configured or configurable on the tank, which makes available a volume additional to the intake volume of the tank, and/or an auxiliary filling line body configured or configurable on the filling line, which makes available a volume additional to the filling-line volume surrounded by the filling line, can dampen or temporally delay pressure oscillations, especially pressure surges, in which gas is present in the liquid container, so that in fact initially the same pressure energy is present in the liquid container as if no auxiliary bodies were present. This pressure energy can no longer propagate in shock or surge fashion due to the at least one auxiliary volume, so that the liquid can be prevented from sloshing out in undesired fashion as a result of undesired pressure increases when filling the liquid container with liquid.

Then, if it is stated in the present application that the auxiliary body, be it configured as an auxiliary tank body and/or as an auxiliary filling line body, this means that with this auxiliary body a permanently present additional volume is flow-connected to the intake volume or the filling line volume. This additional volume is filled, according to its purpose, with gas, and serves as a damping volume. Therefore the additional bodies preferably are attached at such places on the tank and/or the filling line, which usually are not reached by the liquid filled into the liquid container. The permanently configured auxiliary body is preferably always filled with gas, independent of the filling level of the liquid container.

In permanently configured additional bodies, an increase in the volumes present (the intake volume and filling line volume) should be compared with a reference state of an identical liquid container, but one configured without the additional bodies.

In contrast, an auxiliary body is designated as "configurable auxiliary tank and/or auxiliary filling line body" if it merely makes available a temporary auxiliary volume by an increase in the pressure in the interior of the liquid container on a container component exhibited on it (a tank and/or filling line) and which preferably, after the pressure increase has recovered in the interior of the liquid container, regresses to its initial setting or close to its initial setting.

For this, provision can be made that a deformation section of the filling line, configurable as an auxiliary tank body and/or as a configurable auxiliary filling line body, can be less rigid than the particular main sections, so that the deformation section, in otherwise identical conditions, with a preset increase in the pressure in the interior of the liquid container, deforms more severely in terms of an increase in volume of the component that exhibits the particular deformation section than the main section of that same component.

For this the relevant rigidity is a tensile rigidity and/or a flexural stiffness, depending on the structural configuration of the deformation section.

The deformation section, as compared with the main section of that same component, may exhibit less thickness, or generally a deviating form, so that the deformation section, compared with the main section, even assuming that the deformation section and main section have identical material, exhibits less tensile strength and/or less surface moment of inertia, and thus reduced flexural stiffness, in the event of an increase in the pressure in the interior of the liquid container, and thus is more severely deformed.

Provision can be made in addition to, or alternative to, the shape-dependent reduced rigidity of the deformation section of the tank and/or filling line in comparison to the main section of that same container component, that the main section of the tank and/or of the filling line be formed from a thermoplastic or duroplastic, and that the deformation section of the tank and/or of the filling line be made of a deformation material different from the main material, such as rubber, silicon, gum elastic or the like, wherein the base material exhibits a higher modulus of elasticity than the deformation material. In this case the greater rigidity of the main section, compared with that of the deformation section, is to be traced back to the selection of appropriate materials as regards their modulus of elasticity. A higher modulus of elasticity with a shape that is otherwise identical always means greater tensile rigidity and also greater flexural stiffness. Naturally the deformation section of a container component can also be easier to deform, due both to the material and the shape, than the main section of that same material component.

The auxiliary tank body and/or the auxiliary filling line body can, for example, be configured as bellows-like bodies on the particular container component (tank and/or filling line), and in the event of a pressure increase in the interior of the liquid container, under action of the higher pressure, deform against the elastic forces of the bellows section of the auxiliary body in a volume-increasing fashion, and after the pressure increase has been relieved in the interior of the liquid container, again be reset into the original shape.

Likewise the deformation section can be formed by an elastic membrane skin, which can form a section of the tank wall and/or of the filling line wall.

Lastly, the deformation section can also be formed very generally by elastic wall segments of the filling line and/or tank, such as an axial section of the filling line formed from rubber, silicon, gum elastic or a similar elastomer.

A gas bag or gas balloon can also be considered as the reversibly deformable auxiliary body, which, at times of normal, i.e., not increased, pressure, adheres with slack to the interior of the liquid container at the connection site to the tank or filling line, and in the event of a pressure increase in the interior of the liquid container, temporarily fills with gas.

True, for the auxiliary tank and/or auxiliary filling line body to function, it is not required that it be reversibly deformable. However, for reasons of a defined container state during its operation, it is advantageous if the auxiliary tank and/or auxiliary filling line body configurable by deformation be reversibly deformable and after restoration of the pressure in the interior of the liquid container to the pressure value prevailing prior to the pressure increase, for it to again assume the original shape at this pressure value.

As has already been described above, if an auxiliary tank body that is essentially rigid, or and/or an auxiliary filling line body that is essentially rigid, is provided with a constant auxiliary volume on the tank or on the filling line, it is advantageous if their auxiliary volumes are flow-connected with the intake volume or with the filling-line volume surrounded by the filling line—depending on the location at which the auxiliary body is attached—so that pressure surges in the gas space in the liquid container can propagate out into the auxiliary volumes and thus into the particular auxiliary bodies, so that the pressure surge energy can dissipate there.

It is advantageous if the additional volumes of an additional body can be attained by means of a throttle, thus by a narrowing with a smaller flow cross section, from the intake volume or from the filling volume. Preferably therefore, between the auxiliary tank body and the tank, and/or the auxiliary filling line body and the filling line, a flow-mechanics throttle is configured. This especially holds true for shaped auxiliary bodies, thus essentially rigid ones, and also for formable auxiliary bodies. However, since formable auxiliary bodies, due to their resilience, can contribute with the interior damping of their deforming material to the damping of pressure pulses in the liquid container, it is helpful above all to provide a flow-mechanical throttle in the transitional section of rigid auxiliary bodies and the particular container component, on which they are configured. Therefore, according to a further development of the present invention, it is preferred that a narrowing be provided between the auxiliary volume of the essentially rigid auxiliary tank body and the uptake volume and/or of the essentially rigid auxiliary filling line body and the filling line volume, with a smaller cross-sectional surface than a cross-sectional surface of auxiliary volumes and uptake or filling line volumes placed on both sides of the narrowing.

Since it is advantageous for the functioning of the auxiliary body if it remains free of the liquid filled into the liquid container, the preferred auxiliary body of the present invention is an auxiliary filling line body, which, in correspondence to its designation, is formed on the filling line, or able to be formed by increasing the pressure in the interior of the liquid container. Preferably, auxiliary bodies are formed or formable only on the filling line. According to an advantageous further development of the current invention, to avoid unnecessary manufacturing expense, preferably no auxiliary tank bodies which enlarge the intake volume are formed or formable on the tank.

On the filling line, an axial section that completely surrounds the filling line along a virtual filling line path, centrally passing along its path, can be configured as a formed or formable auxiliary filling line body. One such axial section can be implemented with particular manufacturing ease, since here a deformation section needs to be attached needs merely to be attached between two more rigid main sections of the filling line.

The axial section can also be an axial end section, which preferably is an axial end section of the filling line, placed closer to the insertion site, since there is very little likelihood that this axial end section of the filling line, distant from the tank, is impinged on by the liquid placed into the liquid container, due to its position far from the tank. Thus, such an axial end section is always surrounded by a gas space of the filling line, which ensures its capability to function as a damping body for damping of pressure increase surges in the interior of the liquid container.

The filling line can empty in the direction by which gravity acts between the underside and upper side of the tank, into it, and especially can project into the intake volume as a line, such as a tube or hose line.

To ensure ventilation of the liquid container when being filled with liquid, provision can be made that it additionally exhibits a ventilation line, which connects the intake volume with a diversion location placed outside the tank. The diversion location is a location on the longitudinal end of the ventilation line, distant from the tank, placed far from the tank, at which gas forced out of the uptake volume escapes from the ventilation line, as a rule escaping into the atmosphere.

The ventilation line as a rule runs along a ventilation line path.

Additionally, for the damping of pressure increase peaks or surges in the gas space of the ventilation line, the ventilation line can exhibit a damping-ventilation path section with a flow cross section that is larger than the flow cross section of the rest of the ventilation line, or at least one able to be enlarged. As the reference size of the flow cross section preferably normal ventilation line path sections serve, which are placed along one or both sides of the ventilation line path. The flow cross section is to be viewed in each case in a plane orthogonal to the ventilation line path.

In the case of a flow cross section capable of enlargement in the damping-ventilation path section, preferably it is capable of reversible enlargement, so that only in case of need does it assume a larger volume and a larger flow cross section than the normal ventilation line path sections that adjoin on both sides along the ventilation line path.

When the damping-ventilation line path section also exhibits a flow cross section that can be enlarged, especially reversibly enlarged, this enlargement of the flow cross section is able to be reversibly enlarged by increasing the pressure in the interior of the ventilation line.

However, preferably the damping-ventilation line path section is a rigid damping-ventilation line path section, which exhibits a constant shape independent of the gas pressure prevailing in the ventilation line, and thus a constant larger flow cross section than the normal ventilation line path sections adjoining it.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
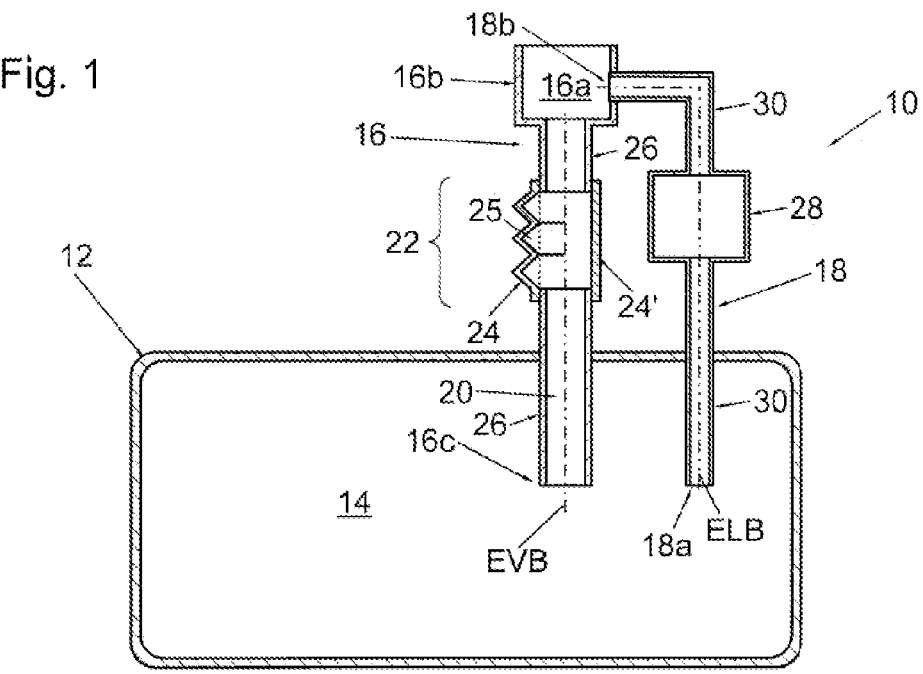
FIG. 1 shows a first embodiment form of an invention-specific liquid container in a roughly schematic sectional view.

Referring now to the drawing wherein the showings are for the purpose of illustrating preferred and alternative embodiments of the invention only and not for the purpose of limiting the same, FIG. 1 shows a first invention-specific set of embodiments wherein a liquid container is designated overall by 10. The liquid container 10 comprises a tank 12, which uses an intake volume 14 for intake of a liquid, especially an aqueous urea solution, which is used to carry out a selective catalytic reaction (SCR) in a motor vehicle.

Along with the tank 12 as a container component, the liquid container 10 comprises a filling line 16 as an additional container component. The filling line 16 produces a flow-mechanics connection between an insertion site 16*a* and the intake volume 14 in the interior of the tank 12. In other words, via the filling line 16, the tank 12 can be filled at an insertion site 16*a* with liquid, which is passed through the filling line 16 from the insertion site 16*a* into the intake volume 14.

In the example shown, the insertion site 16*a* is the longitudinal end of filling line 16, distant from the tank, which can be configured as a connection structure 16*b* for connection of an output end of a filling sleeve or tapping cock, which is not depicted.

The filling line 16 terminates with its other longitudinal end 16*c* on, or in, the uptake volume 14 of tank 12.

Additionally, the liquid container exhibits a ventilation line 18, which leads from its longitudinal end 18*a* closer to the tank, which also can be in the interior of the uptake volume 14 of tank 12, to an escape location 18*b*, which can be any escape location into the atmosphere, but preferably it empties into filling line 16, perhaps in the area of the insertion site 16*a*, or perhaps at the connection structure 16*b*.

Gas, which initially is found in the tank 12 which is empty or has less liquid in it, and which is forced out of it by liquid by a filling process using filling line 16 can escape from the uptake volume 14 through the ventilation line 18 and thus from the tank 12.

In such liquid containers 10, especially if the liquid level in the uptake volume 14 has come up to the filling line 16 and the ventilation line 18, and thus they have been closed, the enclosed gas can be compressed from additional feeding of liquid through the filling line 16 into the uptake volume 14 of tank 12, and, linked with this, there can be increased pressure in the uptake volume 14. This pressure increase can initially be kept in equilibrium by the dynamic pressure of the liquid that continues to flow in through the filling line 16.

However, if the filling process ends, the dynamic pressure of the inflowing liquid drops, as does the equilibrium condition in the filling line, and thus also in the uptake volume 14 that connects with the filling line volume 20 surrounded by the filling line 16, so that the increased internal pressure in the intake volume 14 can be relieved abruptly via filling line 16, but also via ventilation line 18. As a consequence, liquid already placed in the tank 12 can slosh or spray out from the filling line 16 in shocklike fashion at the insertion site 16*a* in an undesired fashion.

To prevent this effect, in the prior-art filling line 16 a check valve is placed, which closes when pressure becomes critical, thus preventing liquid from flowing from the intake volume 14 to the ventilation site 16*a*. In contrast, the liquid container 10 of the present invention does without such a valve device.

The filling line 16 extends along a filling line path EVB. Along one axial section 22 of filling line 16, an auxiliary line body 24 is configured (see the left side of the filling line 16 in FIG. 1). On the right side of the filling line path EVB in FIG. 1 an alternative configuration of the auxiliary filling line body 24 is depicted as an auxiliary filling line body 24'.

The auxiliary filling line body 24 shown on the left side, exhibits a local flow cross section, related to a section plane orthogonal to the filling line path EVB, that is larger than a main section 26 of filling line 16 that is situated outside the axial section 22.

The auxiliary filling line body 24 can be configured as a rigid auxiliary filling line body 24, in the area of which (axial section 22) the filling line 16 exhibits an additional filling line volume 25 per unit of length, as compared with the state in which the filling line 16 would be formed exclusively from the main section 26.

The auxiliary filling line body 24 can alternatively or additionally be formed from a material such as rubber silicon, gum elastic or the like, which exhibits a lower modulus of elasticity than the material of the main section 26 of filling line 16. In this case, in addition to the additional volume that has been permanently provided anyway, the walls of the auxiliary filling line volume 24 radially extend out by an increase in pressure in the interior of liquid container 10, and thereby a further additional filling line volume 25 is made available.

Due to the additional filling line volume 25 and especially due to the additional filling line volume 25 formable due to elastic deformation in the case of an increase in pressure, an abrupt excess pressure reduction in the interior of the liquid container 10 in the axial section 22 of the filling line 16 is dampened, and extended over a longer period, so that an undesired excess pressure surge that arises without the auxiliary filling line body 14, loses its surge character.

In comparison to the alternative of auxiliary filling-line body 24 shown on the left side, the alternative of an auxiliary filling line body 24' on the right side is implemented using a material with a lower modulus of elasticity than the material of the main section 26, but without a permanent auxiliary volume, so that, in the event of a pressure increase, especially an abrupt pressure increase, in the interior of the liquid container 10, the temporarily formed auxiliary filling-line body 24', while forming an auxiliary filling-line volume related to the filling line path EVB, deforms radially outwards, wherein an excess pressure surge in the interior of the liquid container 10 is dampened by the interior damping of the material of the auxiliary filling line body 24' with the preferably reversible elastic deformation, and can be extended over a temporally longer period.

The risk of undesired sloshing out of liquid already placed into the liquid container 10 at the end of a filling process can be substantially reduced thereby, or even eliminated.

For that same purpose, a damping of excess pressure surges in the ventilation line 18, it has a section 28 with a larger line cross section.

The ventilation line 18, which extends along a ventilation line path ELB, exhibits two normal ventilation line path sections 30 in the example shown, which preferably exhibit an essentially constant cross section, and between which the damping line path section 28 occupies a flow cross section that is larger by comparison.

Due to the spontaneous cross-sectional expansion in the area of the damping-ventilation path section 28, here a pressure pulse damping effect can be achieved similar to the one in filling line 16 in axial section 22, which, in the case of the auxiliary ventilation line body 24', is a deformation section and which in the case of the auxiliary ventilation line body 24, can be a deformation section.

In the example depicted, the damping-ventilation line path section 28 is configured as a rigid section, made of roughly the same material, or one similar as regards the modulus of elasticity, as that of the normal ventilation line path sections 30.

Figure 2:
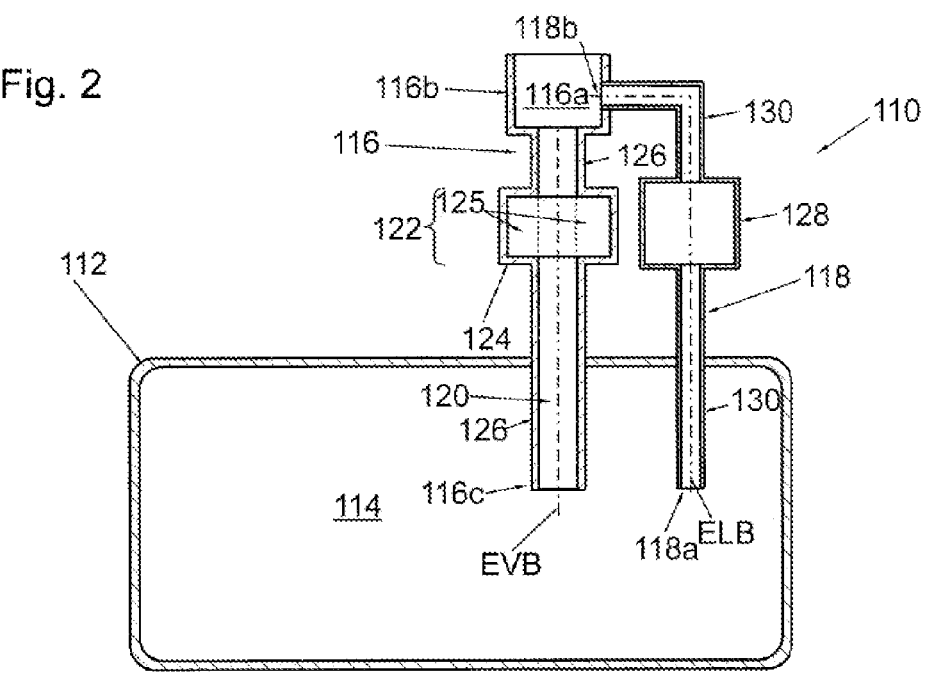
FIG. 2 shows a second embodiment form of an invention-specific liquid container in a roughly schematic sectional view.

In FIG. 2, a second embodiment form of the present invention is shown. The second embodiment form of the present invention is described as follows only to the extent that it differs from the first embodiment form shown in FIG. 1, to the description of which, in other respects, explicit reference is made for explanation of the second embodiment form.

The same components and component sections, and ones with identical functions, as in FIG. 1, are provided in FIG. 2 with identical reference symbols, but increased by the number 100.

The second embodiment form of FIG. 2 differs from the first embodiment form in FIG. 1 only in the shape and design of auxiliary filling line body 124.

In contrast to the first embodiment form, the auxiliary filling line body 124 in axial section 122 is configured to be rigid, and is essentially of unchanging form, together with the main section 126 of filling line 116.

Compared with the filling line 116 in the main sections 126, the rigid auxiliary filling line body 124 in axial section 122 makes available an auxiliary filling line volume 125 which surrounds the filling line path EVB.

Due to the spontaneous increase in the diameter in axial section 122, a shock-like pressure wave propagating in a gas column in filling line volume 120 can be dampened.

In contrast to the first embodiment form, especially there for the auxiliary filling line body 24', the auxiliary filling line body 124 of the second embodiment form is preferably made of the same material as the main section 126 of filling line 116.

Figure 3:
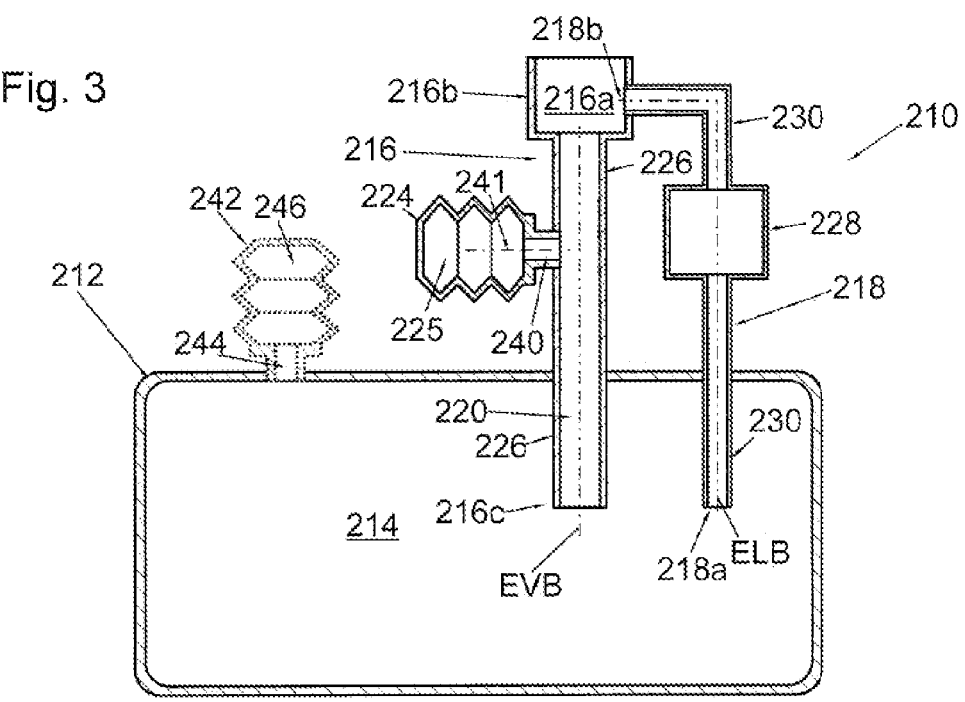
FIG. 3 shows a third embodiment form of an invention-specific liquid container in a roughly schematic sectional view.

In FIG. 3, a third embodiment form of the present invention is depicted, which is described hereafter only to the extent that it differs from the first two embodiment forms, to the description of which, in other respects, explicit reference is made for explanation of the third embodiment form.

The same components and component sections, and ones with identical functions, as in the first embodiment form, are provided in the third embodiment form with identical reference symbols, but increased by the number 200.

In the third embodiment form, the auxiliary filling line body 224 is situated to project laterally from filling line 216. The auxiliary filling line volume 225, which is made available by the auxiliary filling line body 224, is coupled via a narrowing 240 acting as a throttle with the filling line volume 220 in flow-mechanical terms. The narrowing 240 exhibits a smaller flow cross section than the filling line to one side, and than the auxiliary filling line volume 225 on the other side, of the narrowing 240. The flow cross section is to be determined orthogonal to a longitudinal axis 241 running through the narrowing 240 in the incoming flow direction into the auxiliary filling line body 224.

Preferably the auxiliary filling line body 224 is made from a material capable of elastic deformation such as rubber, silicon or gum elastic. In the event of an abrupt increase in pressure in the filling line volume 220, therefore, the auxiliary filling line volume 225 can expand still more via elastic, preferably reversibly elastic, deformation of the auxiliary filling line body 224. The auxiliary filling line body 224 has a bellows-like shape in the embodiment example shown in FIG. 3.

Using dotted lines, an alternative or supplement to the auxiliary filling line body 224 is shown as an auxiliary tank body 242, which is coupled via a narrowing 224 with the uptake volume 214 in flow-mechanical terms. The auxiliary tank body 242 makes available an auxiliary tank volume 246, which, in case the auxiliary tank body 242 is formed from reversibly elastic-deformable elastomer material, in the event of an abrupt increase in pressure in the interior of the tank 212, is able to be still further enlarged by deformation of auxiliary tank body 242.

The elastically deformable auxiliary bodies (auxiliary filling line body 224 and/or auxiliary tank body 242) can dampen abruptly propagating pressure increases in the interior of the liquid container 210, for one, by the auxiliary volumes 225 and 246, respectively, and for another, by further enlargement of this auxiliary volume 225 and 246, and thirdly, by interior damping of the elastically deformable material during the deformation. A further contribution to damping is provided by the narrowings 240 and 244, by means of which the auxiliary bodies (the auxiliary filling line body 224 and/or auxiliary tank body 242) by which the particular volumes of the container components they carry (the filling line 216 and/or tank 212) are connected.

With the solutions proposed in the present application, on a liquid container, an undesired sloshing out of liquid already placed in the liquid container, at the end of a filling process, can, in advantageous fashion, be reduced, or even avoided.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A liquid container for a motor vehicle, especially a urea solution container, the liquid container comprising a rigid tank that essentially does not deform and has an inner rigid tank surface that defines a fixed tank volume and for receiving an associated liquid, the liquid container further including a filling line having a first longitudinal end and a second longitudinal end that is spaced from the first longitudinal end, the filling line extending along a filling line axis from the first longitudinal end to the second longitudinal end, the first longitudinal end being spaced from the rigid tank and the second longitudinal end being on or in the rigid tank, the filling line having a filling line volume, the filling line having a single fluid flow path therein that fluidly connects a fluid insertion site at or near the first longitudinal end with the rigid tank wherein the associated fluid flowing in the single fluid flow path enters the rigid tank though the second longitudinal end, the filling line extending along the filling line axis and having a first line section and a second line section wherein the second line section is positioned axially from the first line section along the filling line axis, the single fluid flow path extending through the first and second line sections, the first line section having a first axial length and the second line section having a second axial length both extending along the filling line axis, the first line section having a first volume and the second line section having a second volume, the first line section essentially does not deform by an increased pressure within the liquid container wherein the first volume is generally fixed, the second line section being deformable along at least a portion of the second axial length by the increased pressure within the liquid container wherein the second volume is variable and increases with the increased pressure such that the filling line volume increases with the increased pressure, the first and the second line sections both being part of the single fluid flow path in the filling line and between the first and second longitudinal ends of the filling line and spaced from the second longitudinal end, the first and the second line sections both being designed to guide the associated liquid through the single fluid flow path when the associated liquid is added to the rigid tank at the insertion site and the associated liquid flowing from the first longitudinal end of the filling line to the second longitudinal end of the filling line to fill the rigid tank.

2. The liquid container according to claim 1, wherein filling line further includes a third line section, the third line section being axially spaced from the first and second line sections along the filling line axis and in the single fluid flow path, the third line section having a third axial length and extending along the filling line axis, the third line section having a third volume and the third line section essentially does not deform by the increased pressure within the liquid container wherein the third volume is generally fixed.

3. The liquid container according to claim 2, wherein the second line section has an upper extent in fluid connection with the third line section and a lower extent in fluid connection with the first line section wherein the second line section is between the first and third line sections.

4. The liquid container according to claim 2, wherein the first line section has a first cross-sectional area, the second line section has a second cross-sectional area and the third line section has a third cross-sectional area, the second cross-sectional area being greater than the first cross-sectional area and being greater than the third cross-sectional area.

5. The liquid container according to claim 2, wherein the first line section has a first cross-sectional area, the second line section has a second cross-sectional area and the third line section has a third cross-sectional area, the increased pressure increasing the second cross-sectional area but not increasing that first and third cross-sectional areas.

6. The liquid container according to claim 1, wherein the filling line axis is linear.

7. The liquid container according to claim 1, wherein the rigid tank has an upwardly facing side, the rigid tank including an auxiliary tank body extending from the upwardly facing side and separate from the filling line, the auxiliary tank body having an auxiliary tank body volume and being deformable by the increased pressure within the liquid container wherein the auxiliary tank body volume is variable and increases with the increased pressure.

8. The liquid container according to claim 7, wherein a narrowing is provided between the rigid tank and the auxiliary tank body.

9. The liquid container according to claim 1, further including a ventilation line in fluid connection with the fixed tank volume.

10. The liquid container according to claim 1, wherein the first line section is formed from a first material and the second line section is formed from a second material, the first material exhibiting a higher modulus of elasticity than the second material.

11. The liquid container according to claim 10, wherein the first material includes at least one of a thermoplastic and a duroplastic material.

12. The liquid container according to claim 10, wherein the second material includes at least one of a rubber material, a silicon material, and a gum elastic material.

13. The liquid container according to claim 1, wherein the second line section includes a second filling line shape that exhibits less rigidity than a first filling line shape of the first line section so that the second line section deforms more severely with the increased pressure and at least partially produces the variable volume of the second line section with the increased pressure such that the filling line volume increases with the increased pressure.

14. The liquid container according to claim 1, wherein the second line section is automatically and fully reversibly deformable and assumes its initial shape after the increased pressure is restored in the interior of the liquid container to the value prevailing before the increased pressure.

15. The liquid container according to claim 1, wherein the fixed tank volume remains constant even with the increased pressure.

16. The liquid container according to claim 1, further including a ventilation line which connects the fixed tank volume with an escape site situated outside the tank.

17. The liquid container according to claim 1, further including a ventilation line, the ventilation line runs along a ventilation line path wherein the ventilation line, along a damping-ventilation line path section, exhibits a flow cross section that is larger, or able to be enlarged, than normal ventilation line path sections on either side of the damping-ventilation line path section along the ventilation line path.

18. The liquid container according to claim 17, wherein the damping-ventilation line path section exhibits a flow cross section that is able to be reversibly enlarged.

19. The liquid container according to claim 17, wherein the flow cross section of the damping-ventilation path section, and thus a ventilation line section volume surrounded by it, is able to be reversibly enlarged by the increased pressure in the interior of the ventilation line.

* * * * *